United States Patent
Crosta et al.

(10) Patent No.: US 12,012,084 B2
(45) Date of Patent: Jun. 18, 2024

(54) MULTI-PLATFORM SYSTEM FOR CHECKING THE BRAKING APPARATUS OF LAND VEHICLES HAVING AT LEAST TWO AXLES

(71) Applicant: VAMAG S.R.L., Cassano Magnago VA (IT)

(72) Inventors: Gianfranco Crosta, Cassano Magnago VA (IT); Alessandro Ratti, Cassano Magnago VA (IT)

(73) Assignee: VAMAG S.R.L., Cassano Magnago VA (IT)

( * ) Notice: Subject to any disclaimer, the term of this patent is extended or adjusted under 35 U.S.C. 154(b) by 279 days.

(21) Appl. No.: 17/829,434

(22) Filed: Jun. 1, 2022

(65) Prior Publication Data

US 2022/0388491 A1   Dec. 8, 2022

(30) Foreign Application Priority Data

Jun. 7, 2021   (IT) .................... 102021000014741

(51) Int. Cl.
*B60T 17/22* (2006.01)

(52) U.S. Cl.
CPC .................. *B60T 17/221* (2013.01)

(58) Field of Classification Search
CPC ................. B60T 17/221; G01L 5/28
See application file for complete search history.

(56) References Cited

U.S. PATENT DOCUMENTS

| | | | | |
|---|---|---|---|---|
| 5,305,636 A * | 4/1994 | Balsarotti | ......... | G01L 5/28 73/121 |
| 5,477,739 A * | 12/1995 | Holler | ......... | B60T 7/20 280/DIG. 4 |
| 5,979,230 A * | 11/1999 | Balsarotti | ......... | G01L 5/288 73/121 |
| 10,300,897 B2 * | 5/2019 | Georgin | ......... | B60W 10/188 |
| 2002/0166371 A1 * | 11/2002 | Ratti | ......... | B60C 23/06 73/146 |
| 2003/0145651 A1 * | 8/2003 | Hofmann | ......... | B60T 13/662 73/146 |
| 2005/0273241 A1 * | 12/2005 | Tsukasaki | ......... | B60T 8/172 701/79 |
| 2021/0046913 A1 * | 2/2021 | Wirthl | ......... | B60T 8/88 |
| 2022/0017092 A1 * | 1/2022 | Kim | ......... | B60W 10/192 |

FOREIGN PATENT DOCUMENTS

| DE | 19530328 A1 | 2/1997 |
|---|---|---|
| EP | 3256830 A2 | 12/2017 |

\* cited by examiner

*Primary Examiner* — David J Bolduc (74) *Attorney, Agent, or Firm* — Bay State IP, LLC (57) ABSTRACT

A multi-platform system and a brake checking method for a braking capacity of a vehicle with at least two wheel axles is disclosed. The system comprises pairs of detection platforms aligned according to a direction of movement on two parallel paths, spaced apart by a distance related to the wheelbase of a vehicle, each detection having at least a resting surface configured with detection and measuring means apt to detect at least a horizontal and vertical component of a stress applied by the vehicle wheels to such surfaces, as well as at least a checking unit which detects the trend over time of said at least a horizontal and vertical component of the stress said at least a checking unit having data processing means apt to integrate in time said at least a horizontal component and vertical component for each wheel of said wheel axles.

7 Claims, 7 Drawing Sheets

Fig. 3B

Six discontinuous pairs (12 platforms)

Consolle with PC

Fig. 1A

Eight pairs in line (16 platforms)

Consolle with PC

Fig. 1B

Front platforms

Back platforms

MULTI-PLATFORM SYSTEM FOR CHECKING THE BRAKING APPARATUS OF LAND VEHICLES HAVING AT LEAST TWO AXLES

CROSS REFERENCE TO RELATED APPLICATIONS

This application claims the benefit and takes priority from the Italian Patent Application No. 102021000014741 filed on Jun. 7, 2021, the contents of which are herein incorporated by reference.

FIELD OF THE INVENTION

The present invention relates to a system and a method for checking the braking capacity of a road vehicle.

As is well known, the behaviour of a road vehicle during deceleration (braking) phase is determined by the way the wheels interact with the road surfaces and the dynamic forces acting on the vehicle, which in turn depends fundamentally on the state of motion of the vehicle, the arrangement of the suspension system and the effectiveness of the braking apparatus in dynamic conditions.

Therefore, the present invention relates to a system and a method for checking the braking capacity of land vehicles with rubber tyres, which takes into account the entire dynamics of the vehicle. More specifically, the system takes into account the checking of the braking capacity of vehicles with more than two axles.

TECHNICAL BACKGROUND

The dynamics and safety of a vehicle are determined by its ability to control, in particular its ability to stop, especially in emergency conditions. In turn, the ability to control depends on the forces of interaction between the vehicle wheels and the road surface, forces which develop as a function of the state of motion of the vehicle. The forces of interaction between the wheels and the road or resting surface can be broken down into three components, which have different effects on the behaviour of the vehicle:
- a force component in the vertical direction, which determines the maximum limit—a function of the product between this component and the friction coefficient— for the other two components of the force (hereinafter this component is designated by the direction z, see FIG. 3B);
- a force component in the direction of movement, which determines the reaction necessary to linearly accelerate or decelerate the vehicle (hereinafter, this component is designated by the direction x, see FIG. 3A);
- a force component in the direction transverse to the movement (but still on the plane of movement), which is the one that determines the possibility for the vehicle to turn (hereinafter this component is designated by the direction y, see FIG. 3A).

The dynamic behaviour of a vehicle is determined by the two components in the direction of movement (x) and transverse direction (y), while the vertical component (z) determines the permissible limit for the other two components, because it constitutes an index of proximity from the detachment of the wheel from the road surface (with consequent uncontrollability of the vehicle's movement).

It is therefore essential that the forces are distributed correctly between the various wheels, otherwise the vehicle is prone to lose control.

This also applies, and particularly, during a deceleration (braking) phase of the vehicle.

Therefore, it has already been proposed to use systems for checking the braking apparatus of a land vehicle which detects forces in dynamic conditions. A particularly effective apparatus of this type, which can also be used with multi-axle vehicles, is that described in document EP3256830 owned by the same Applicant, which is considered comprised here as a reference. This document discloses an apparatus provided with a plurality of pairs of force detection platforms, on which the forces between the wheels and the resting plane of multi-axle vehicles passing over them in a decelerated dynamic motion are detected and integrated.

However, the Applicant has found that there is room for further improvement of this multi-platform checking system.

In fact, it is not only useful to provide check methods which supply stability indices which can be easily interpreted by users and operators, but it would be useful to have a checking method also for composite vehicles, for example formed by a power car and a trailer. In fact, the latter type of vehicle exhibit additional critical factors in braking, because the two vehicle parts (power car and trailer) are articulated on a vertical axis and therefore the braking dynamics are also affected by the additional degrees of freedom existing between the two braking parts of the vehicle.

DE 19530328 discloses a brake check platform system for multi-axles of a truck wherein various braking parameters are measured and indicated as a function of time and/or as a function of the force applied to the brake pedal or as a function of the servo-cylinder pressure. No suggestion about a condition of risk is provided.

SUMMARY OF THE INVENTION

The object of the present invention is to provide a method for checking the braking apparatus of a vehicle on wheels, which uses the detection of forces on multiple pairs of platforms to determine the dynamic behaviour during deceleration.

In particular, it is intended to provide such a checking method which offers innovative diagnostics providing stability indices which can also be understood by non-experienced users and are suitable for multi-axle vehicles being checked, both in the case of single multi-axle vehicle (for example, isolated lorries) and in the case of composite vehicles, such as a power car with a trailer or semi-trailer or an articulated lorry.

Such an object is achieved with a system and a method as described in essential terms in the main attached claims. Other preferred features of the invention are defined in the dependent claims.

BRIEF DESCRIPTION OF THE DRAWINGS

Further features and advantages of the invention will anyhow be more evident from the following detailed description of a preferred embodiment, given by mere way of non-limiting example and illustrated in the accompanying drawings, wherein.

DETAILED DESCRIPTION OF A PREFERRED EMBODIMENT

Figure 1A:
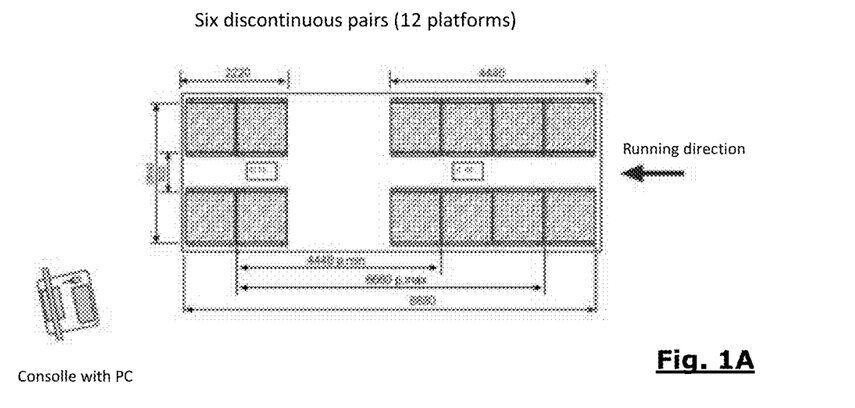
FIGS. 1A and 1B are schematic plan views of two exemplary multi-platform apparatuses according to the invention.
Figure 1B:
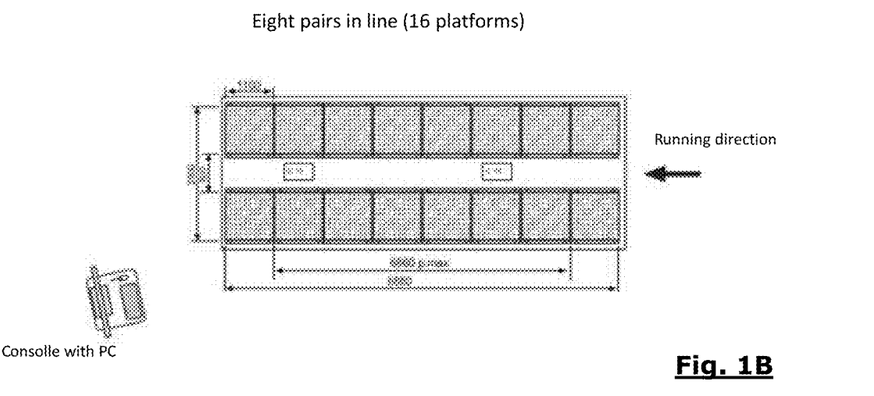

FIGS. 1A and 1B show two different multi-platform brake check systems, also called multi-platform brake test bench (12 platforms in one case and 16 platforms in the other case). This type of system is known per se, for example from EP3256830 or from the MULTI 4PLD/C™ system commercially available from Vamag SpA.

A plurality of platforms, arranged in pairs (six or eight pairs in the respective figures) from the two parts of and along a measuring axis, is mounted floating or fixed with respect to a work plane (typically a plane on the ground on which the vehicles being tested can transit) and is provided with appropriate force detection sensors (typically load cells) to be able to measure forces applied to the individual platforms over time. The forces are those typically transferred from the overlying vehicle to the platform by means of the rubber tyres, in static and/or dynamic conditions: therefore they are forces in the plane of the platform (Fx, Fy) and also perpendicular (Fz) thereto.

A console is also provided where a processing unit (PC) and a display unit (monitor) are integrated, which allows to acquire, process and display the data coming from the force detection sensors on the platforms.

Figure 2:
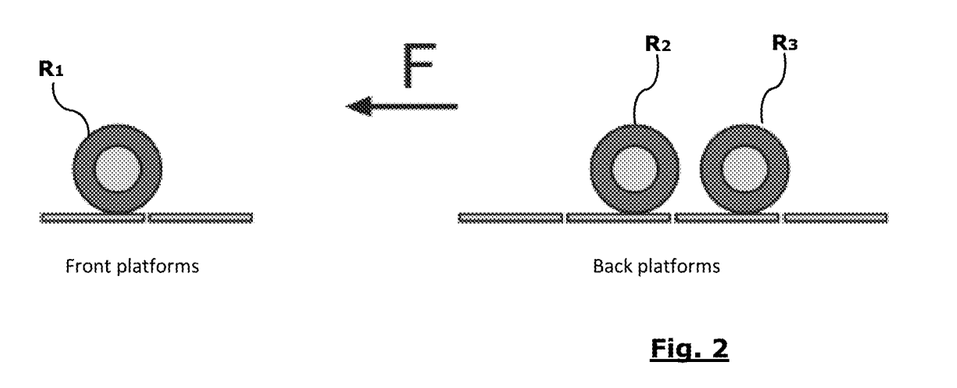
FIG. 2 is a schematic side elevation view of three axles of a vehicle travelling on an apparatus as in FIG. 1A.

In FIG. 2, wheels are schematically shown on one side of a three-axle vehicle, while they transit on the plurality of plates or platforms of FIG. 1A.

As mentioned in the introduction, each platform is arranged (installed fixed or floating on the ground, depending on the technology) to measure three force components (see FIGS. 3A and 3B), one component in the vertical direction $F_z$, one component in the running direction $F_x$ and a component in the direction transverse to the running direction $F_y$. An appropriate integration over time of these forces on the plurality of platforms—for example as taught in EP3256830—allows to determine the trend over time of the forces applied to each wheel of the vehicle during a braking phase.

It should be noted that a vehicle on wheels, however small and compact it may be, cannot be schematized as a point, but can be represented as a body with a proper volume, for which the dynamics of movement can significantly modify the distribution of the acting forces and the consequent inertia reactions. For example, when a vehicle steers, it can be modelled as an object subjected to the combination of the weight force (vertical) and the centrifugal force (transverse to the motion) applied to the centre of mass (centre of gravity CG) thereof, which will be at a certain height from the road or resting plane and in a certain position on the horizontal plane (with a certain deviation from the theoretical geometry of the vehicle, depending on the actual distribution of the masses due to constructive criteria, asymmetries, wear, levels of consumables, etc.).

In particular, it should be borne in mind that the centre of gravity CG is raised from the ground and that the only forces acting on the vehicle—in addition to the inertia acting in the centre of gravity—are determined by the wheel-ground contact. But the centre of gravity CG, as a result of the suspensions, can move with respect to the wheels so that, during steering or braking, the inner wheels will be affected by a vertical component $F_z$ different from the outer wheels and, similarly, the front wheels will be affected by a vertical component $F_z$ different from the rear wheels, to the point of possibly causing the loss of contact of a wheel in extreme steering conditions.

This implies the need to measure the distribution of wheel-to-ground contact forces in dynamic conditions.

Given the above, many parameters contribute to the correct performance of a vehicle, making it even more difficult to manage vehicles with a high number of axles, in which the static and dynamic distribution of forces is regulated by more complicated equations.

The inventors have realised that there is the possibility of defining and detecting some simplified parameters, which allow to adequately depict the dynamic behaviour of the vehicle upon braking, without necessarily having to develop all the complex equations which define the dynamics of the vehicle.

These parameters can be derived from the force measurements obtained with a multi-platform test apparatus (i.e., with multiple pairs of test platforms) as shown by way of example in FIGS. 1A and 1B.

As indicated above, a fundamental factor is represented by the distribution of the vertical force $F_z$ on the wheels, which is represented simply by the weight force of the vehicle in static conditions plus the weight forces and inertial forces in dynamic conditions.

Figure 3A:
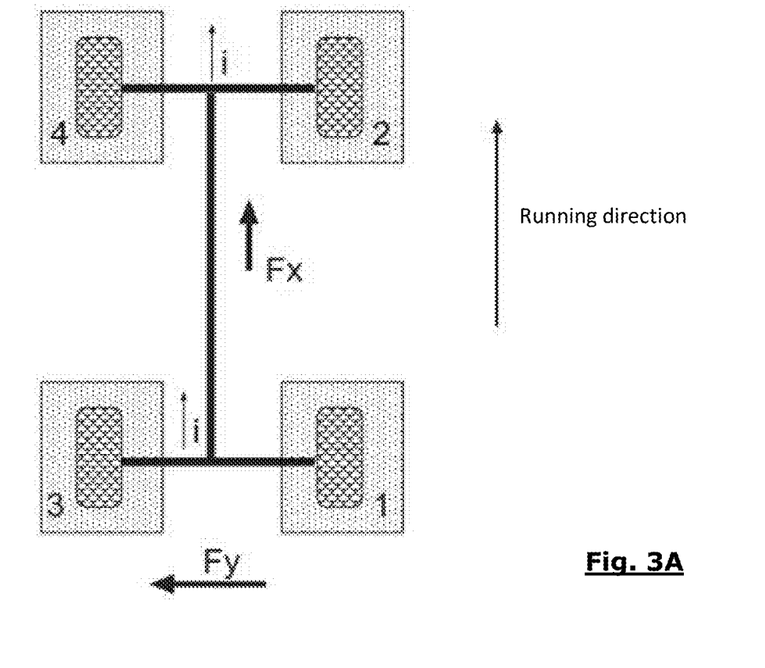
FIG. 3A is a schematic top plan view of a reference system for a two-axle vehicle.
Figure 3B:
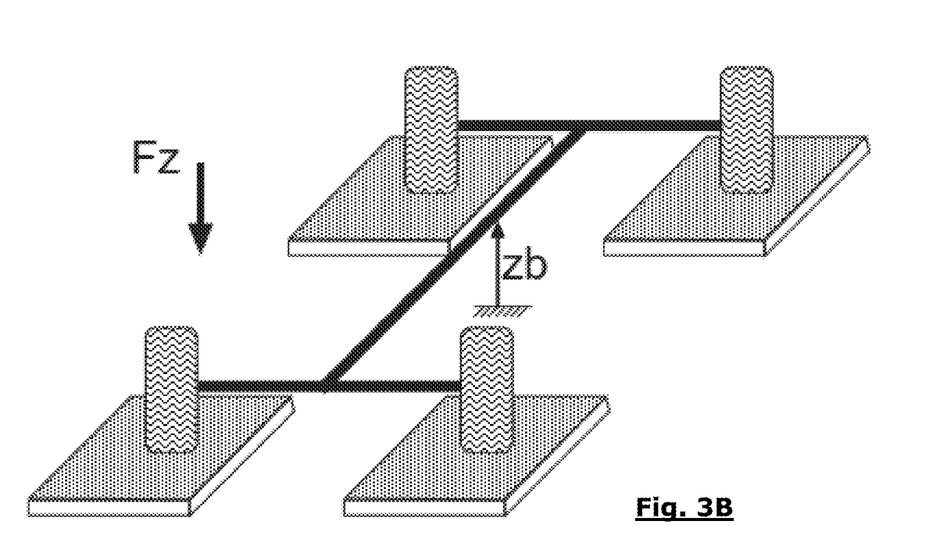
FIG. 3B is a perspective view of a reference system for a two-axle vehicle.

For example, in a four-wheeled vehicle, a reference system is defined for simplicity in which the four wheels are placed in the four symmetrical positions with respect to a point of origin of the system, where +x is a distance in the running direction or advancement of the vehicle and +y is a distance in the transverse direction towards the left side of the vehicle. This implies this determination in static conditions (FIG. 3A)

rear right wheel 1 coordinates $-x, -y$: weight $p(1)$,
front right wheel 2 coordinates $x, -y$: weight $p(2)$,
rear left wheel 3 coordinates $-x, y$: weight $p(3)$,
front left wheel 4 coordinates $x, y$: weight $p(4)$.
and $$P=p(1)+p(2)+p(3)+p(4) \qquad (eq. 1)$$

Where P is the total weight force acting on the vehicle. Consequently, the coordinates of the vehicle centre of gravity, which derive from the actual distribution of the masses of the vehicle, are:

$$xb=(-x*p(1)+x*p(2)-x*p(3)+x*p(4))/P=x*(-p(1)+p(2)-p(3)+p(4))/P$$

$$yb=(-y*p(1)-y*p(2)+y*p(3)+y*p(4))/P=y*(-p(1)-p(2)+p(3)+p(4))/P \qquad (eq.2)$$

In the case of multi-axis systems, simply $xb=\Sigma x(i)*p(i)/\Sigma p(i)$, $yb=\Sigma y(i)*p(i)/\Sigma p(i)$, in an arbitrary chosen coordinate reference system. It is understood that x(i) and y(i) are respectively the coordinates x and y on a resting plane of the i-th wheel and p(i) is the vertical component (Fz(i)) of the stress detected by the force sensor of the test platform) for said i-th wheel, the coordinates of the wheels corresponding with the coordinates of the geometric centre of the test platforms.

If the vehicle has a perfectly symmetrical distribution of the weights with respect to the wheels, it has: xb, yb=0.0. Otherwise, a specific intermediate position of the centre of gravity on the horizontal plane will be identified.

During braking, in ideal dynamic conditions (i.e., with inertia forces), the position of the centre of gravity should only move in the direction of movement (in this case +x), increasing the vertical force component on the front wheels and reducing it on the rear wheels. No variation of yb should be expected; otherwise, the lateral displacement would become an index of system instability, which can generate a yaw skid: such an index can be displayed on the console of the checking apparatus with a symbol which is intuitive for the user as a vehicle fault signal (see for example the right diagram in FIG. 6).

The height of the centre of gravity can be relevant for understanding the behaviour of the vehicle when braking, because the height of the centre of gravity causes a moment with respect to the resting plane of the wheels, due to the inertia forces of the mass of the vehicle, which generates a displacement of loads from the rear wheels to the front wheels; the height of the centre of gravity from the road or resting plane contributes in the same way to the displacement of loads between internal wheels and external wheels upon steering, and the resulting unbalance entity can be used to define the stability of the vehicle when turning.

The height of the centre of gravity cannot be measured statically the rough the checking platforms, but can be determined, as a first approximation, based on the displacement of the braking loads. If F is the total braking force, imagined applied to the centre of gravity of the vehicle, during braking this force determines a moment equal to $$F*zb \text{ (where } zb \text{ is the height of the centre of gravity from the wheel resting plane, see FIG. 3B).}$$

This moment, due to the suspensions being yieldable, causes a rotation of the car around the horizontal transverse axis of the car; when the car has reached the maximum rotation (i.e., it is at the point where the rotation begins to reverse), the total moment must be zero (the vehicle no longer rotates) thus the moment generated by the braking force must be compensated by the moment generated by the difference between the reaction of the vertical forces on the wheels of the front and rear axle; as a first approximation, using the same reference system indicated above, considering that the total braking force $F=\Sigma f(i)$, where f(i) is the (horizontal) braking force on axis i, measured by the platforms of the braking test system (for example according to one of the modes indicated in EP'830), the following is obtained:

$$F*zb = x(2)*p(2) + x(4)*p(4) - x(1)*p(1) - x(3)*p(3) \qquad (eq. 3)$$

Such a simplification assumes that during braking the inertial centre of gravity moves only in the direction of movement (i.e., in the direction +x), increasing the vertical force component on the front wheels and reducing it on the rear wheels, while no variation of yb is expected, since this displacement would generate a yaw skid.

Figure 4A:
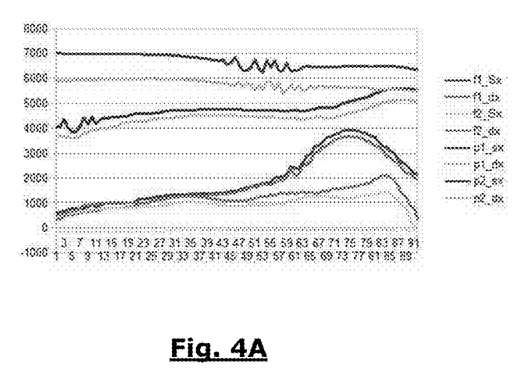
FIG. 4A is an exemplary plot of the dynamic trend of forces detected on wheels of a vehicle.

Similarly to the centre of gravity, the centre of action of the braking forces C.F., allows to have an indication of the unbalance of forces during braking in dynamic conditions. The coordinates of the centre of action of the forces are obtained as follows:

$$xf = (-x*f(1) + x*f(2) - x*f(3) + x*f(4))/F = x*(-f(1) + f(2) - f(3) + f(4))/F$$

$$yf = (-y*f(1) - y*f(2) + y*f(3) + y*f(4))/F = y*(-f(1) - f(2) + f(3) + f(4))/F \qquad (eq. 4)$$

in which the tangential forces are detected through force sensors on the test bench plates in dynamic conditions. FIG. 4A shows an exemplary plot of the forces detected (both tangential and perpendicular) on the test bench plates upon the passage of a two-axle (and four-wheel) vehicle.

According to the invention, with the braking test of a vehicle, both the centre of gravity and the centre of forces in dynamic conditions are calculated with the formulae set out above: for the centre of gravity C.G. the weights, the vertical forces, p(i) are used, while for the centre of forces C.F. the braking forces f(i) are used; therefore the equations (2) and (4) are formally identical but applied to two different sets of forces. Thereby the relative position of the two centres is determined: the position offset between the centre of gravity (C.G.) and the centre of the braking forces (C.F.)—as exemplified by the two points on the right side of FIG. 6—provides an indication of the level of instability in deviation, with possible lurching of the car. In particular, if the distance between the centre of gravity C.G. and the centre of the forces C.F., both in the transverse and in the longitudinal direction of the vehicle, exceeds a predetermined threshold level, the system according to the invention generates a graphic representation understandable to the user, which acts as an index of anomaly.

Figure 6:
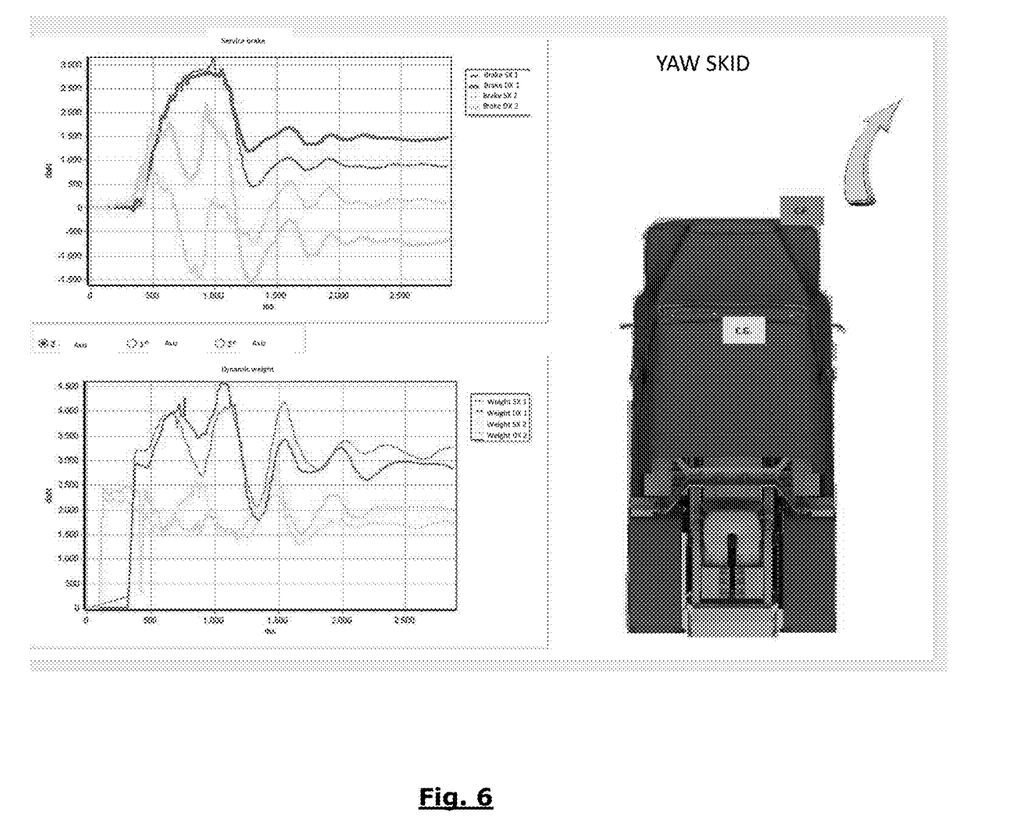
FIG. 6 is an exemplary depiction of detected force plots and a graphical indication of an unbalance condition of a vehicle.

As shown in FIG. 6, the two positions of C.G. (centre of gravity) and C.F. (centre of action of the braking forces) are determined and possibly graphically depicted on a display/monitor of a console of the test apparatus.

The centre of the forces C.F. determines how the dynamic braking forces are distributed with respect to the vehicle; the ideal condition is that the C.F. is positioned in the centre of the vehicle in the normal braking condition; during an emergency braking it can move to the front of the vehicle, but not excessively. If the centre of forces C.F. is positioned excessively on the front of the vehicle, this may mean that the vehicle has a poor braking capacity on the rear wheels, or that the front suspensions do not have good efficiency. If the centre of the forces C.F. is positioned on one side of the central symmetry axis, this can indicate an excessive unbalance of the braking forces.

The calculated position of the centre of gravity C.G. under dynamic condition (eq. 2) is a significant index of how the dynamic weights are distributed during braking. The ideal condition is that the C.G. remains positioned in the centre of the vehicle in the normal braking condition: if it is positioned excessively on the front part, this can mean that the vehicle has a poor braking capacity on the rear wheels, or the front suspensions do not have good efficiency.

If the dynamically calculated C.G. is positioned to the side, this can be an index of an excessive unbalance of the dynamic weight forces.

The above calculations can be extended to vehicles with more than 2 axles, but are only valid for the "rigid" part of the vehicle, therefore in the case of a power car with trailer they must be limited to the calculation on the wheels of the power car and, separately, for the trailer.

In the case of multi-axle vehicles, where the axles are grouped in rigid subsections (power car and trailer), a useful parameter for determining the quality of the braking apparatus is the time shift between the braking actions of the various sections.

By virtue of the specific detection according to the invention, it is possible to intuitively determine for the user, the possible lurching effect caused by an ineffectiveness of the braking apparatus. Such a lurching effect is recognised when the driver of the vehicle sees the vehicle steering to the right or left during braking, in a more or less dangerous manner as a function of the speed of the vehicle and the intensity of the braking. This is determined by the calculation of the braking force in relation to the dynamic load or suspension.

Figure 4B:
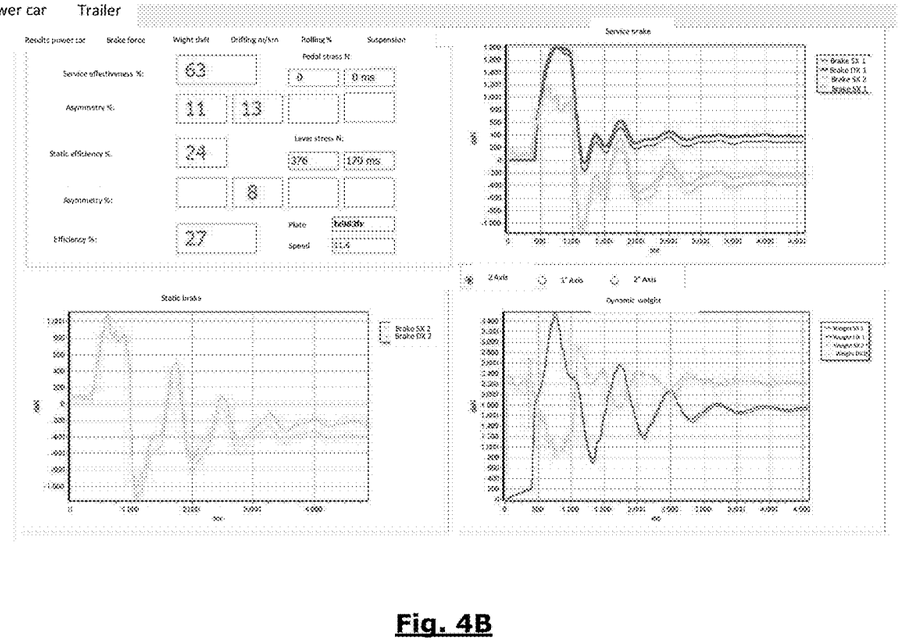
FIG. 4B is an exemplary depiction of data and plots of the detected forces.

An exemplary data reporting table with relative plots is illustrated in FIG. 4B, which can be displayed on a monitor of a console of the checking system. In addition to the precise data showing, in a manner known per se, the loads detected on the individual wheels, with the method according to the invention it is possible to provide an immediate indication of the lurching effect present on the vehicle.

Figure 5:
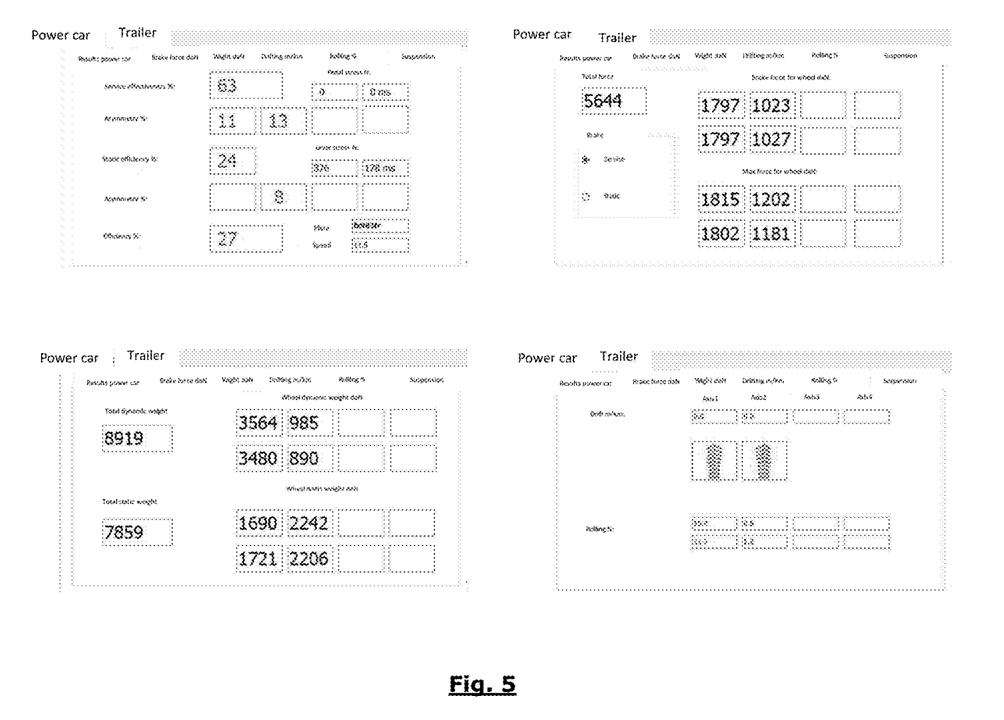
FIG. 5 is an exemplary depiction of data and plots of forces detected on a power car.

FIG. 5 shows the precise data, both static and dynamic, of the weights and braking forces of a power car. A final summary table (bottom right) shows drifting and rolling indications. The drift, or dynamic convergence, is expressed in m/Km and also in graphic format: it can be shown no deviation, or open/closed deviation. Furthermore, rolling is also measured, i.e., the friction force of the individual wheels with the resting surface when rolling without traction drive and without activated brakes: the value detected during the test must be lower than a threshold set at 4% of the static weight on the single wheel; otherwise, the data is highlighted in some intuitive manner for the user, for example red, to signal that an anomaly exists.

FIG. 6 shows the trend over time of the braking force and the dynamic weights on the two sides of the individual axles (the measurement on the first axis is shown in the figure). For each position over time, the numerical data and their percentage unbalance on the two sides of the vehicle are also displayed. By moving with a pointer (such as a mouse) along the graph, the respective numerical values can be displayed in the fields below which are designed for that purpose.

Furthermore, it is possible to provide an additional important parameter in the case of articulated vehicles, for example comprising a power car and a trailer. In fact, for the braking stability, it is important that the axles of the trailer begin to brake before those of the power car: otherwise the trailer pushes on the power car and even small braking dissymmetries can rotate the power car, affecting the direction of advancement and producing a so-called "knife effect" or "book folding closure".

According to the invention, it is therefore provided to detect both the braking effect in time of power car and trailer, and the direction of the braking force acting on the trailer.

An indication of the direction of application of the braking force is given by the position along coordinate y of the centre of the braking forces C.F. of the power car (or tractor) and trailer: if the two positions are not aligned, a moment is generated which will tend to rotate the power car from one side or the other.

Due to the simultaneous measurement of all the braking forces with the system according to the invention, the braking force of the power car F(m) and its transverse position yf(m) can be obtained, as well as the braking force of the trailer F(r) and its transverse position yf(r): if transverse position yf(m) is different from transverse position yf(r), and at the same time a deceleration quantity of the trailer (F(r)/trailer weight) is lower than a deceleration quantity of the power car (F(m)/power car weight), during braking an instability which could make braking dangerous can be experienced. This information is accordingly displayed by the system of the invention, to supply the user useful data to assess braking apparatus effectiveness.

Figure 7A:
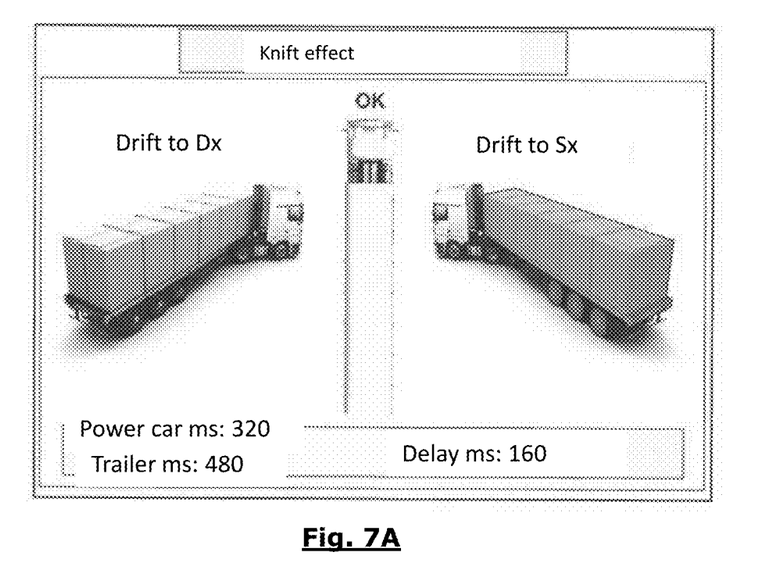
FIGS. 7A and 7B are exemplary depictions of graphical indications showing an unbalance condition of an articulated vehicle.
Figure 7B:
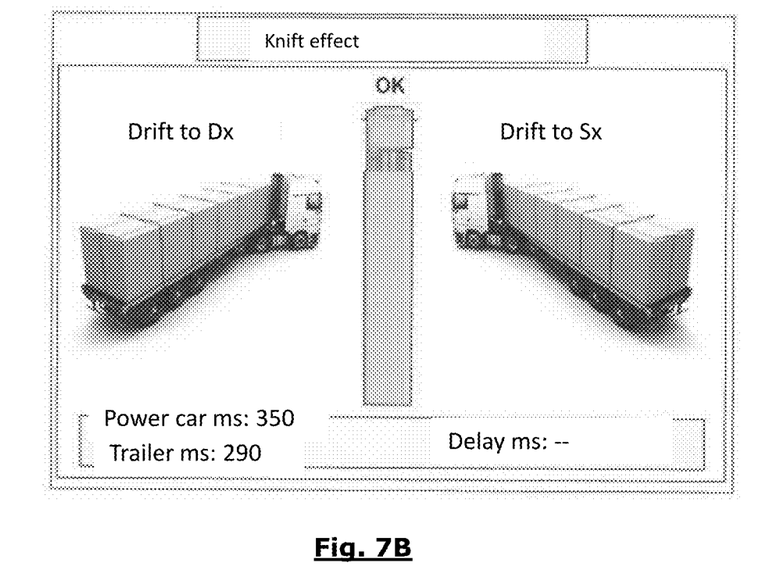

FIGS. 7A and 7B show two examples of possible visual information to the user of the checking system according to the invention. When the difference between yf(m) and yf(r) exceeds a predetermined threshold and, at the same time, the respective power car and trailer deceleration values are unfavourable, a condition of risk is determined and the system displays the condition of FIG. 7A on a monitor, in which one of the two side figures (in the example that on the right) is highlighted—depending on whether the difference between yf(m) and yf(r) is positive or negative—indicating a condition of risk. Conversely, if such a difference is lower than the predetermined threshold, a regularity condition is determined and the system displays the condition of FIG. 7B on the monitor, in which the central picture is highlighted.

Figure 8:
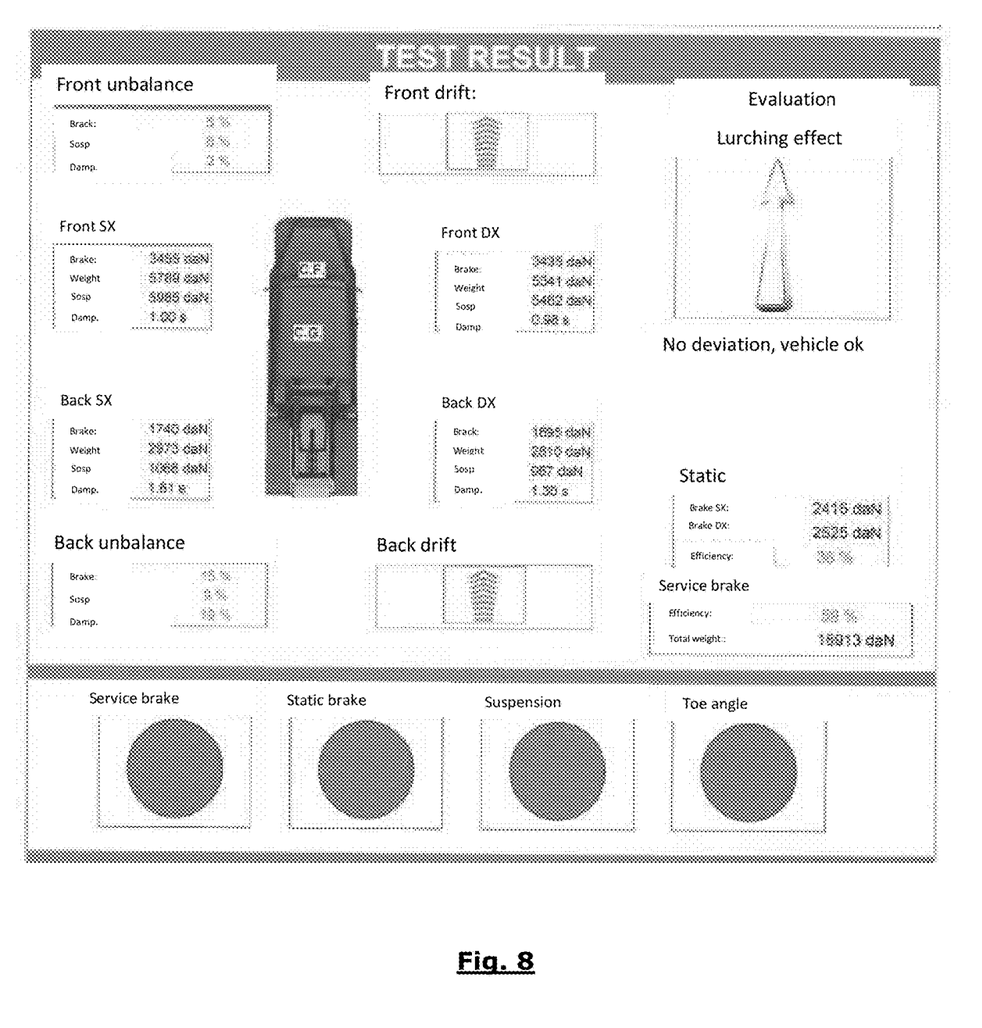
FIG. 8 is an exemplary depiction of an information framework summarising the data collected with the system according to the invention.

Finally, a summary diagnostic layout (FIG. 8) can be displayed, which shows the significant numerical values and the outcome of the checks on a single window of the console monitor (possibly capable of being printed).

What is claimed is:

1. A brake check multi-platform system for checking the braking capability of a vehicle with at least two wheel axles comprising:
   pairs of detection platforms aligned according to a running direction on two parallel paths, spaced apart by a distance related to a vehicle axle track, each detection platform having
   at least a resting surface arranged with detection and measuring means apt to detect at least a horizontal component (Fx(i), Fy(i)) and a vertical component (Fz(i), p(i)) of a stress applied by vehicle wheels to said resting surfaces, as well as
   at least a checking unit which determines said at least a horizontal component (Fx(i), Fy(i)) and vertical component (Fz(i), p(i)) of the stress along time,
   said at least a checking unit having data processing means apt to integrate in time said at least a horizontal component (Fx(i), Fy(i)) and vertical component (Fz(i), p(i)) for each wheel of said wheel axles,
   wherein said checking unit is arranged to determine also, during a braking action of said vehicle on said detection platforms, at least
   coordinates of a centre of gravity (C.G.) in dynamic conditions, thus defined:

$xb=\Sigma x(i)*p(i)/\Sigma p(i), yb=\Sigma y(i)*p(i)/\Sigma p(i)$ where x(i) and y(i) are the x and y coordinates, respectively, on said resting surface of the $i^{th}$ wheel and p(i) is said vertical component (Fz(i)) of the stress detected for said $i^{th}$ wheel,
   and coordinates of a centre of the braking forces (C.F.) in dynamic conditions, thus defined:

$xf=\Sigma x(i)*f(i)/\Sigma f(i),$ $yf=\Sigma y(i)*f(i)/\Sigma f(i),$ where f(i) is said horizontal component of stress on axis i, and said checking unit is arranged to supply a risk condition warning proportional to a relationship between the positions of said centre of gravity (C.G.) and said centre of the braking forces (C.F.).

2. The brake check multi-platform system as in claim 1, wherein said risk condition warning is determined if positions of said centre of gravity (C.G.) and said centre of the braking forces (C.F.) are mutually spaced apart in a crosswise direction (y) transversal to the running direction of the vehicle beyond a first threshold and are mutually spaced apart in a longitudinal direction (x) to said running direction of the vehicle beyond a second threshold.

3. The brake check multi-platform system as in claim 1, wherein said checking unit determines also, during said braking, a height of said centre of gravity (C.G.) along time with respect to said resting surface by means of a calculation of $$F*zb=\Sigma x(i)*p(i)$$

wherein $F=\Sigma f(i)$ and $f(i)$ is the braking force in correspondence of the $i^{th}$ wheel.

4. The brake check multi-platform system as in claim 1, wherein said checking unit determines separately transversal coordinates of said centre of the braking forces (C.F.) for a power car (yf(m)) and a respective trailer (yf(r)) and supplies an instability index proportional to a difference between said transversal coordinates (yf(m), yf(r)) when at the same time a deceleration quantity of said power car (F(m)/power car weight) exceeds a deceleration quantity of said trailer (F(r)/trailer weight).

5. A brake checking method of a braking system of a vehicle, the method comprising:
supplying a brake check multi-platform system as in claim 1,
detecting at least a horizontal component (Fx(i), Fy(i)) and a vertical component (Fz(i)) of a stress applied by the vehicle wheels to said platforms,
determining said at least horizontal component (Fx(i), Fy(i)) and vertical component (Fz(i)) of the stress along time and integrating in time said at least a horizontal component (Fx(i), Fy(i)) and vertical component (Fz (i)) for each $i^{th}$ wheel of vehicle wheel axles, characterised in that it furthermore comprises determining, during a braking action of said vehicle on said detection platforms, at least
position coordinates of a centre of gravity (CG) in dynamic conditions, thus defined:

$$xb=\Sigma x(i)*p(i), yb=\Sigma y(i)*p(i)$$

where x(i) and y(i) are the x and y position coordinates, respectively, on a resting surface of the $i^{th}$ wheel and p(i) is the vertical component (Fz(i)) of the stress detected for said $i^{th}$ wheel,
and position coordinates of a centre of the braking forces (CF) in dynamic conditions, thus defined:

$$xf=\Sigma x(i)*f(i)/\Sigma f(i),$$

$$yf=\Sigma y(i)*f(i)/\Sigma f(i),$$

where f(i) is said horizontal component of stress on axis i,
and supplying a risk condition warning proportional to a relationship between the positions of said centre of gravity (C.G.) and said centre of the braking forces (C.F.).

6. The method as in claim 5, wherein said risk condition warning is determined if said centre of gravity (C.G.) and said centre of the braking forces (C.F.) are mutually spaced apart in a crosswise direction (y) transversal to a direction of movement of the vehicle beyond a first threshold and are mutually spaced apart in a longitudinal direction (x) to said direction of movement of the vehicle beyond a second threshold.

7. The method as in claim 5, wherein, by means of said platforms, a braking force of a power car F(m) and a braking force of a trailer F(r) of an articulated vehicle are separately and simultaneously detected and said risk condition warning is determined depending on the difference of a deceleration of said trailer (F(r)/trailer weight) and of a deceleration of said power car (F(m) power car weight).

* * * * *